United States Patent [19]
Magyar

[11] Patent Number: 5,839,538
[45] Date of Patent: Nov. 24, 1998

[54] FOLDABLE PORTABLE TREE STAND

[76] Inventor: Dennis R. Magyar, 427 Allen St., Mayville, Wis. 53050

[21] Appl. No.: 560,364

[22] Filed: Nov. 17, 1995

[51] Int. Cl.[6] .................................................. A01M 31/02
[52] U.S. Cl. ............................................ 182/20; 182/116
[58] Field of Search ............................. 182/116, 20, 106, 182/187

[56] References Cited

U.S. PATENT DOCUMENTS

| | | | |
|---|---|---|---|
| 2,388,892 | 11/1945 | Wilson | 182/106 |
| 3,282,375 | 11/1966 | Ray | 182/116 X |
| 3,336,999 | 8/1967 | McSwain | 182/20 |
| 4,614,252 | 9/1986 | Tarner | 182/116 |
| 5,064,020 | 11/1991 | Eagleson | 182/116 X |
| 5,105,908 | 4/1992 | Freund | 182/20 |
| 5,564,524 | 10/1996 | Thaggard | 182/116 |

*Primary Examiner*—Alvin C. Chin-Shue
*Attorney, Agent, or Firm*—Donald Cayen

[57] ABSTRACT

A foldable portable tree stand is comprised of top and bottom ladder sections hinged to each other, a platform rotatably connected to the top ladder section, and double-angle beams pivotally connected to the platform. When the ladder sections are unfolded, the double-angle beams are retained to the top ladder section to support the platform in a working position. A front guard is slidable within the top ladder section to provide a front railing for the platform. Side guards are slidable within the front guard to provide side railings for the platform. Legs are independently slidable within the bottom ladder section to enable the tree stand to accommodate uneven ground. The top ladder section is swingable to overlie the bottom ladder section. The platform can then rotate to a folded position overlying the top ladder section. The double-angle beams are pivotable to a storage mode between wheels mounted to the bottom ladder section. The double-angle beams are further pivotable to a transport mode whereat they are held to the bottom ladder section and serve as handles for transporting the tree stand over the ground.

15 Claims, 4 Drawing Sheets

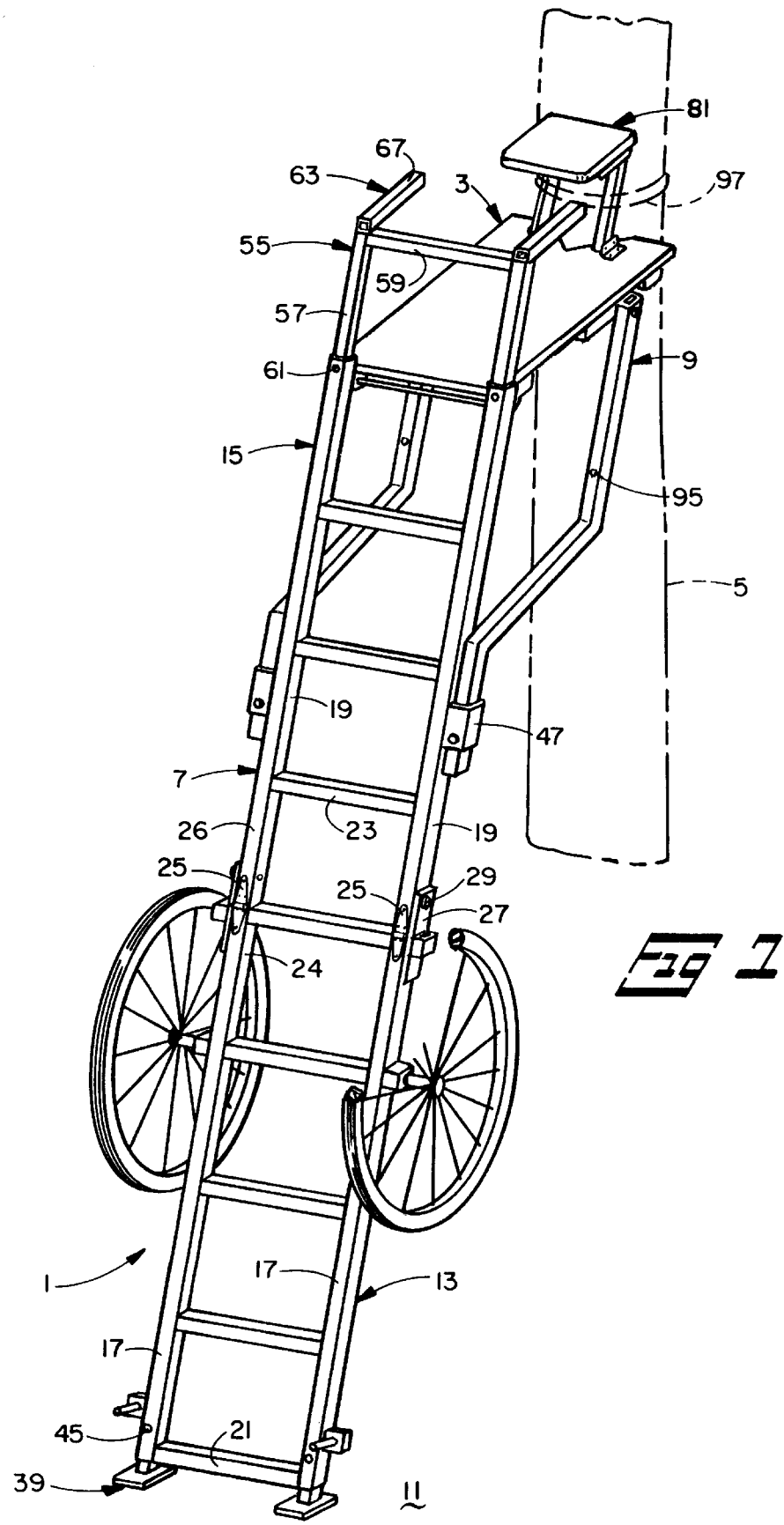

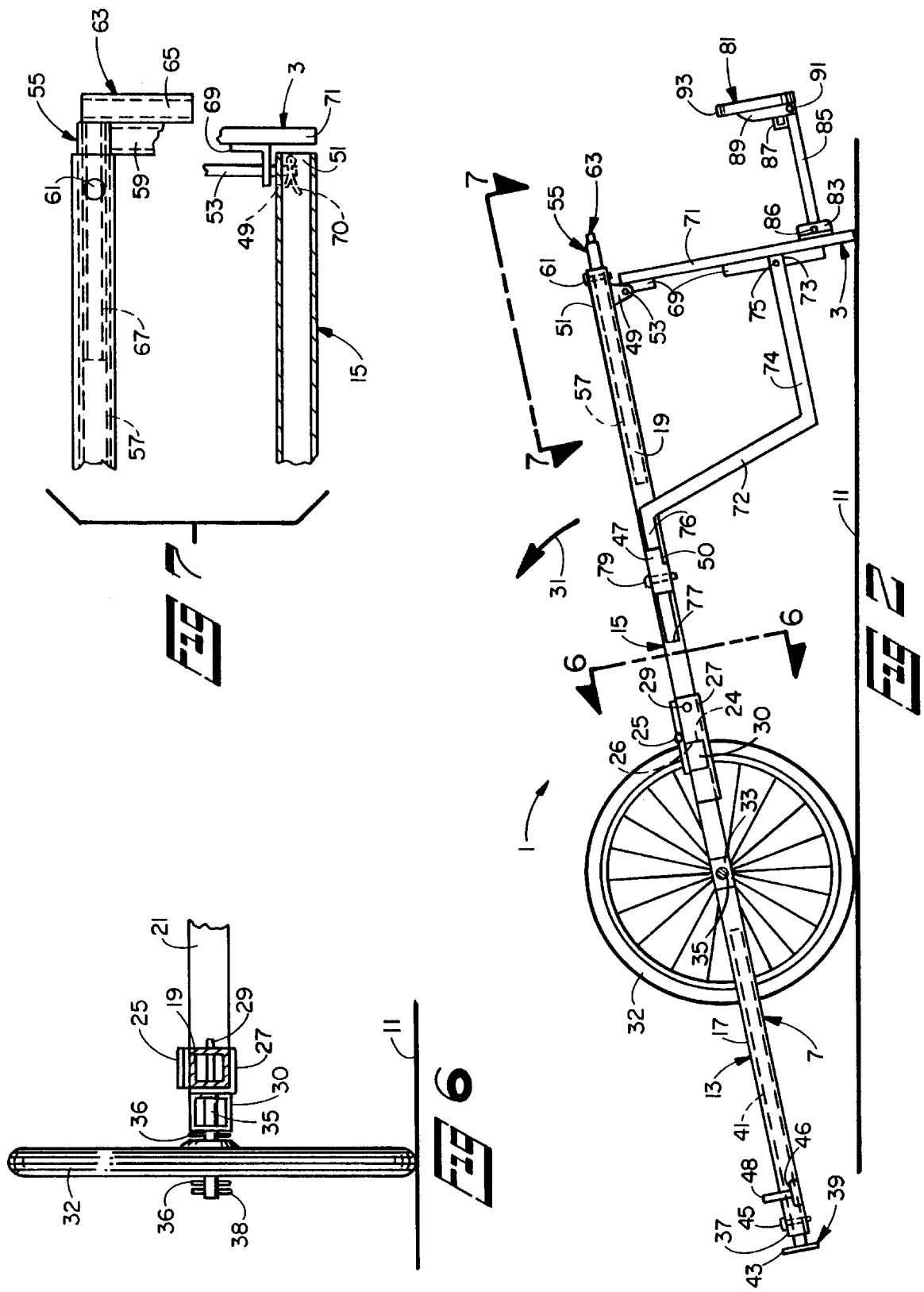

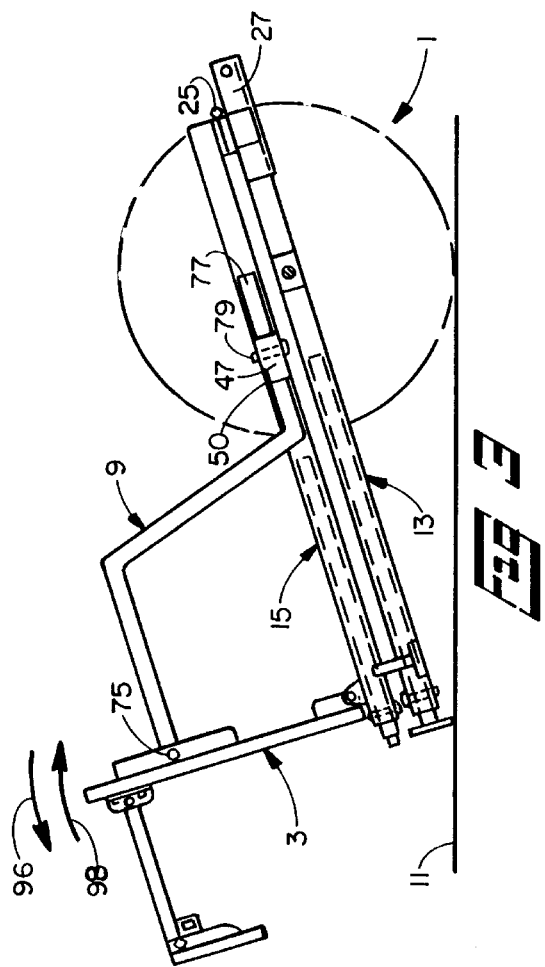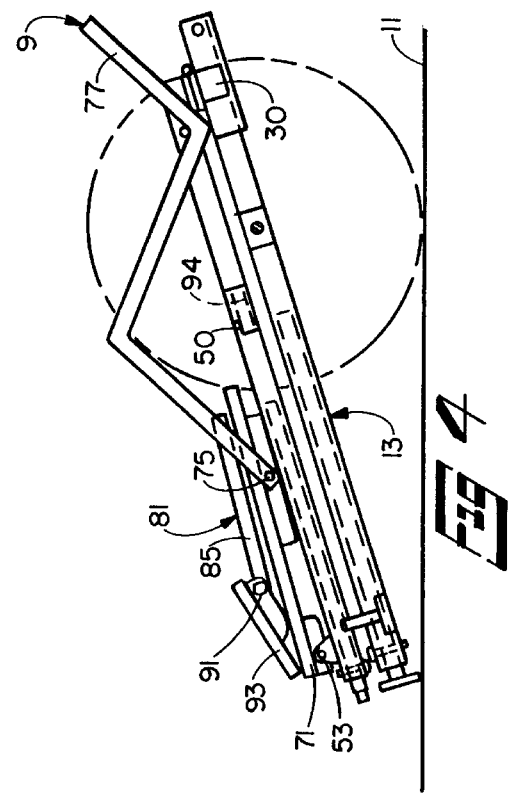

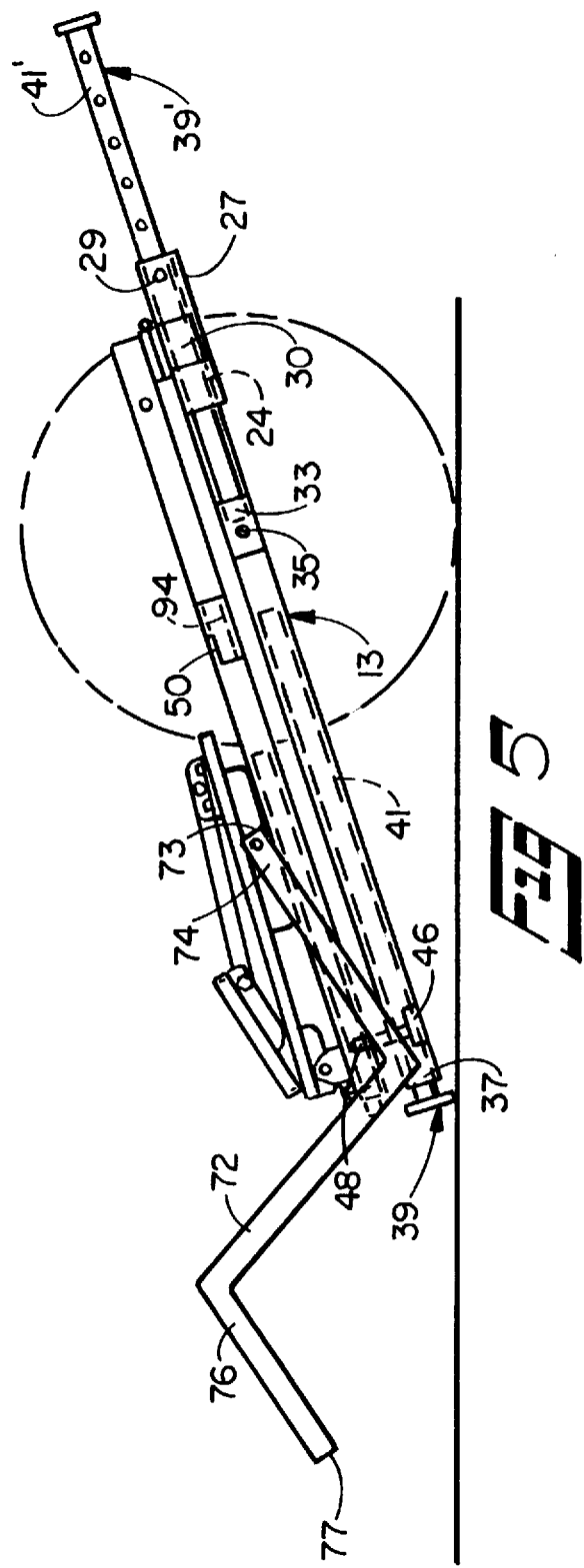

FOLDABLE PORTABLE TREE STAND

BACKGROUND OF THE INVENTION

1. Field of the Invention

This invention pertains to hunting equipment, and-more particularly to apparatus usable as a hunting stand and a game transporter.

2. Description of the Prior Art

Various types of tree stands have been developed that enable hunters to sit elevated above the ground. Some tree stands are combined with ladders, which are often foldable. A seat or platform is invariably included at the upper end of the ladder. In some designs the platforms are rigid with respect to the ladder, and in other designs the platforms are foldable. Examples of ladder type tree stands may be seen in U.S. Pat. Nos. 4,552,247; 4,905,792; 5,009,283; 5,064,020; 5,105,908; 5,253,732; and 5,267,632.

Some ladder type tree stands are equipped with wheels or rollers that make the tree stands easy to bring in and out of the woods. U.S. Pat. Nos. 3,282,375; 5,195,611; 5,242,030; 5,282,520; and 5,314,042 show wheeled ladder type tree stands.

A common problem with prior wheeled ladder type tree stands is the lack of convenient handles for pushing or pulling the tree stand along the ground. Of the foregoing patents, only U.S. Pat. No. 3,282,375 includes components that function exclusively as handles. However, the handles are rigidly fixed to and protrude from the ladder in a manner that renders them likely to snag a hunter's clothing.

In U.S. Pat. No. 5,253,732 a yoke at the bottom of the ladder doubles as a stabilizer for the tree stand and as a handle when the tree stand is folded. Because the yoke becomes embedded in the ground, it is often dirty and wet and thus uncomfortable for later use as a handle.

Thus, despite the large number of existing ladder type tree stands available, there nevertheless is room for improvements to them.

SUMMARY OF THE INVENTION

In accordance with the present invention, a foldable portable tree stand is provided that is more convenient to use, collapse, and transport then prior tree stands. This is accomplished by apparatus that includes double-angle beams that function both as transport handles and as supports for a platform.

The double-angle beams are pivotally attached at their first ends to opposite sides of the platform. The platform, in turn, is rotatably connected to the upper end of a top ladder section. The lower end of the top ladder section is hinged to the upper end of a bottom ladder section. The two ladder sections are swingable relative to each other between unfolded and collapsed conditions. When the ladder sections are in their unfolded condition, they are coplanar. The double-angle beams can then be pivoted to a support mode whereat their second ends are retained to the top ladder section to assist supporting the platform in a working position. When the ladder sections are in their collapsed condition, the top ladder section overlies the bottom ladder section. The second ends of the double-angle beams are then detachable from the top ladder section such that the platform can be folded to overlie the top ladder section. The double-angle beams can then be pivoted between storage and transport modes.

A pair of pins secured to the bottom ladder section hold the double-angle beams in the transport mode. The bottom ladder section is provided with an axle for mounting a pair of wheels. When the ladder sections are in the collapsed condition and the double-angle beams are in the transport mode, the second ends of the double-angle beams serve as convenient and comfortable handles for wheeling the foldable portable ladder tree stand over the ground. For storing the foldable portable tree stand, the double-angle beams are pivoted to the storage mode whereat they lie primarily between the wheels.

The bottom ladder section includes legs that are independently slidable inside the ladder section rails and are pinable in place in the rails. The rails of the top ladder section contain a U-shaped front guard that is slidable between stored and operating locations. A pair of side guards are removably stored in the front guard. When stored, the side guards are coplanar with the front guard.

To use the foldable portable tree stand at a hunting location, the double-angle beams are unpinned from the bottom ladder section. The platform is rotated to its working position approximately 100 degrees to the top ladder section. Simultaneously, the double-angle beams are pivoted about their attachments to the platform to their support mode, whereat their second ends are retained to the top ladder section. As a result, the platform is rigidly supported at its working position on the upper end of the top ladder section.

The top ladder section is unfolded so as to be coplanar with the bottom ladder section. The sections are pinned to each other to keep them rigidly in the unfolded condition. The unfolded tree stand is then ready for erecting against and strapping to a tree or the like. To increase the height of the platform above the ground or to accommodate an uneven ground contour, the legs can be pulled independently of each other from the rails of the bottom ladder section and pinned thereto at desired extensions.

After the hunter has climbed the ladder sections to the platform, he opens a seat that is part of the platform and straps the seat to the tree. He pulls the front guard upwardly out of the top ladder section to the desired height and pins it in place. He then pulls the side guards out of the front guard and reinserts them to extend horizontally and perpendicular to the front guard, thereby creating a three-sided safety railing.

The method and apparatus of the invention, using double-angle beams having the dual functions of platform support and transport handles, thus provides exceptional convenience to hunters. The foldable portable tree stand is quickly and easily transported to and unfolded and erected at a hunting site, and it is equally easy collapsed and transported from the site.

Other advantages, benefits, and features of the present invention will become apparent to those skilled in the art upon reading the detailed description of the invention.

BRIEF DESCRIPTION OF THE DRAWINGS

FIG. 1 is a perspective view of the foldable portable tree stand shown erected against a tree.

FIG. 2 is a side view of the foldable portable tree stand in the unfolded condition and resting on the ground.

FIG. 3 is a side view of the foldable portable tree stand shown with the top ladder section collapsed and overlying the bottom ladder section.

FIG. 4 is a side view of the foldable portable tree stand showing the platform folded, the seat closed, and the double-angle beams in the storage mode.

FIG. 5 is a view similar to FIG. 4, but showing the double-angle beams in the transport mode.

FIG. 6 is a partial cross sectional view on an enlarged scale taken along line 6—6 of FIG. 2.

FIG. 7 is a partially broken view on an enlarged scale taken along line 7—7 of FIG. 2.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring first to FIG. 1, a foldable portable tree stand 1 is illustrated that includes the present invention. The foldable portable tree stand 1 is shown in an unfolded condition and erected against a tree 5. The foldable portable tree stand includes a platform 3 that supports a hunter at an elevated location above the ground 11. The platform 3 rests against the tree 5 and is held in place by a ladder 7 and a pair of double-angle beams 9. Suitable straps, not shown, are tied between the ladder 7 and the tree. FIG. 2 shows the foldable portable tree stand in the unfolded condition of FIG. 1, but resting entirely on the ground 11.

The ladder 7 of the foldable portable tree stand 1 is comprised of a bottom ladder section 13 and a top ladder section 15 having respective side rails 17 and 19. I have found that four foot lengths for the bottom and top ladder sections 13 and 15, respectively, work very well, as do 1.25 inches square tubing for the rails 17 and 19. I prefer five rungs 21 on the bottom ladder section and three rungs 23 on the top ladder section. The upper end 24 of the bottom ladder section is hinged to the lower end 26 of the top ladder section by a pair of hinges 25 mounted to the associated rails.

To maintain the ladder sections 13 and 15 in the unfolded condition of FIGS. 1, 2, and 6, a short angle 27 is welded to the upper end 24 of each rail 17 of the bottom ladder section. The angles 27 extend past the upper edges of the rails of the bottom ladder section. Pins 29 pass through aligned holes in the angles and in the rails 19 of the top ladder section 15. Removal of the pins 29 enables the top ladder section to swing over the bottom ladder section in the direction of arrow 31. A short tube 30 is welded to each angle 27. One end of each tube 30 is aligned with the upper edge of the bottom ladder section.

To enable the foldable portable tree stand 1 to be transported easily over the ground 11, a pair of wheels 32 are mounted to the bottom ladder section 13. For that purpose, a pair of short tubes 33 are welded to the outside of the rails 17. An axle 35 extends through each tube 33 and adjacent rail. If desired, one long axle can be used to extend between both rails and the associated tubes 33. The wheels 32 are kept in place on the axles 35 by washers 36 and hitch pins 38. In FIG. 1, the wheels are shown on the axles. However, to minimize the size of the foldable portable tree stand to nearby game, and to prevent alerting the game by any rotation of the wheels in the wind, I prefer to remove the hitch pins 38 and wheels when the tree stand is erected.

Inserted in the lower end 37 of each rail 17 of the bottom ladder section 13 is a leg 39. Each leg 39 has a long bar 41, which may be a one inch square tube, and a pad 43. A pin 45 passes through a hole in each rail and through any of several holes in the leg bar 41. There is a small plate 46 welded or otherwise secured to the outside of each bottom ladder section rail near the lower end 37 thereof. A pin 48 is welded to and upstands from each plate 46.

In addition to the rails 19 and rungs 23, the top ladder section 15 also comprises a pair of short tubes 47 welded to the outsides of the rails. Each tube 47 has a cutout 50 in the wall thereof that is on the same side of the rails 19 as the platform 3. The cutouts 50 are at the ends of the tubes toward the platform. There is a tab 49 welded to each rail at the rail upper end 51. A long rod 53 extends between the tabs 49.

Inserted in the upper end 51 of the top ladder section rails 19 is a U-shaped front guard 55. Also see FIG. 7. The front guard 55 has two side legs 57 that are slidably received in the top ladder section rails and a connecting cross leg 59. Pins 61 extend through holes in the top ladder section rails and any of several holes in the front guard side legs 57.

Slidingly inserted in the side legs 57 of the front guard 55 are a pair of L-shaped side guards 63. Each side guard 63 has a relatively short arm 65 and a longer arm 67. The pins 61 pass through aligned holes in the side guard long arms 67. The front guard is preferably made from one inch square tubing, and the side guards are made from 0.75 inches square tubing.

The platform 3 is supported on the rod 53. For that purpose, the rod passes through angles 69 that are attached to the platform floor 71. The platform floor 71 and angles 69 are free to rotate about the rod 53 between folded and working positions. Cotter pins 70 on the ends of the rods keep the platform floor and angles in place.

To help support the platform 3 in the working position of FIGS. 1, 2, and 7, each double-angle beam 9 has a elongated center section 72 and oppositely extending first and second end sections 74 and 76, respectively. The ends 73 of the first end sections 74 are pivotally attached to the outside edges of the platform angles 69 by pins 75. The ends 77 of the second end sections 76 are received in associated tubes 47. Pins 79 retain the second end sections to the tubes 47 such that the double-angle beams are in a support mode and the plane of the platform floor is substantially perpendicular to the plane of the ladder 7.

Secured to the floor 71 of the platform 3 is a seat 81. In the illustrated construction, the seat 81 includes a pair of brackets 83 secured to the platform floor. A pair of legs 85, which may be approximately 16 inches long, are pivotally connected by pins 86 to respective brackets 83. The two legs 85 are joined at their upper ends by a cross tube 87. A pair of braces 89 are pivotally connected to the legs 85 by associated pins 91. A bench 93 is fastened to the braces 89. The legs 85 are free to pivot about the pin 86 in both directions from their positions shown in FIG. 2. The bench 93 and braces 89 are free to pivot only in a clockwise direction about the pins 91 from their position shown in FIG. 2. When the foldable portable tree stand 1 is erected against a tree 3, FIG. 1, a strap 97 is used to hold the seat 81 against the tree.

Now turning to FIG. 3, the foldable portable tree stand 1 is shown in a partially collapsed condition. Specifically, the top ladder section 15 is shown swung over to overlie the bottom ladder section 13. To achieve that, the pins 29 are removed from the angles 27 and the top ladder section rails 19, and the top ladder section is swung over by means of the hinges 25.

To fully collapse the foldable portable tree stand 1, the pins 79 are removed from the tubes 47 and the double-angle beams 9. The platform 3 is rotated a short distance in the direction of arrow 96 such that the ends 77 of the double-angle beams are removed from their respective tubes 47. The pivotal attachments of the double-angle beams to the platform enables removal of the double-angle beams from the tubes 47. With the double-angle beams out of the tubes 47, the platform is rotated in the direction of arrow 98 until the platform rests on the top ladder section 15, FIG. 4. The seat 81 is closed to overlie the platform by swinging the legs 85 about the pins 86 and the bench 93 about the pins 91. If desired, the seat can be closed before the hunter descends from the platform. The double-angle beams can then be pivoted to a storage mode such that they rest on the tubes 30 of the bottom ladder section 13. The fully collapsed foldable portable tree stand of FIG. 4 then occupies a minimum of space for storage.

When returning the double-angle beams to the support mode, their ends 77 can initially rest on the walls 94 of the tubes 47 opposite the tube cutouts 50. The walls 94 serve as ledges that help guide the double-angle beams completely into the tubes 47.

Further in accordance with the present invention, the foldable portable tree stand 1 can be transported over the ground 11 like a wheelbarrow. To do so, the double-angle beams 9 are pivoted about the pins 75 to the transport mode of FIG. 5. The double-angle beams are pivoted until their first end sections 74 rest on the plates 46 of the bottom ladder section 13. The pins 48 pass through holes 95 in the first end sections of the double-angle beams. Also see FIG. 1. By inserting hitch pins, not shown, through small holes in the pins 48, the double-angle beams are held to the bottom ladder section. The second end sections 76 of the double-angle beams are then in a position to serve as handles for transporting the foldable portable tree stand over the ground. In that manner, a hunter can not only transport the foldable portable tree stand itself, but also his equipment and any game he has killed.

To transport large game, the legs 39 are removed from the lower end 37 of the bottom ladder section 13 by removing the pins 45. The legs are reassembled as represented by reference numeral 39' to the upper end 24 of the bottom ladder section. The leg bars 41' are inserted through the tubes 30 and into the wheel tubes 33 against the axle 35. The pins 29 are replaced through the bars 41' and the angles 27 to retain the legs 39' in place.

Returning to FIG. 1, it will be appreciated that the legs 39 enable the foldable portable tree stand 1 to be safely erected on uneven ground 11 by using the pins 45 with suitable holes in the leg bars 41. In addition, the height of the platform 3 above the ground can be increased by extending the legs from the bottom ladder section 13.

In FIG. 1, the front guard 55 is shown in its operative location in which the side legs 57 have been slid partially out of the associated top ladder section rails 19 for a desired distance. The pins 61 engage the top ladder section rails and desired holes in the front guard side legs. The cross leg 59 then serves as a front railing to the platform 3 against which the hunter can lean or use as a shooting rest.

FIG. 1 also shows the side guards 63 in their operative location. The long arms 67 are pulled out of the side legs 57 of the front guard 55. The side guard short arms 65 are reinserted into the front guard side legs such that the side guard long arms are perpendicular to the front guard cross leg 59. Accordingly, the platform 3 has side railings as well as a front railing.

In summary, the results and advantages of hunters' tree stands can now be more fully realized. The foldable portable tree stand 1 provides both an elevated platform 3 from which a hunter can watch for game and a convenient way to transport the platform and game. This desirable result comes from using the combined functions of the double-angle beams 9. When the foldable portable tree stand is in the unfolded condition, the double-angle beams help support the platform in a working position. When the foldable portable tree stand is in a collapsed condition, the double-angle beams are held to the ladder 7 to serve as handles for transporting the foldable portable tree stand and any game over the ground 11. When the foldable portable tree stand is in its collapsed condition, the double-angle beams can be pivoted to a storage mode adjacent the wheels 32, thereby enabling the collapsed tree stand to occupy a minimum of space. When the foldable portable tree stand is in its unfolded condition and erected against a tree or the like, the front guard 55 and side guards 63 provide railings around a portion of the platform. The legs 39 can be used both to accommodate the foldable portable tree stand to uneven ground and to help support and transport large game.

It will also be recognized that in addition to the superior performance of the foldable portable tree stand 1, its construction is such as to cost no more than traditional wheeled ladder type tree stands. Also, since it is made of a simple design and rugged components, the need for maintenance is minimal.

Thus, it is apparent that there has been provided, in accordance with the invention, a foldable portable tree stand that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A foldable portable tree stand comprising:
   a. a bottom ladder section having upper and lower ends;
   b. a top ladder section having upper and lower ends;
   c. hinge means for enabling the top and bottom ladder sections to collapse and unfold relative to each other;
   d. wheel means mounted to the bottom ladder section for transporting the foldable portable tree stand over the ground;
   e. platform means connected to the upper end of the top ladder section for rotating between a working position and a folded position; and
   f. beam means for selectively pivoting to a support mode to cooperate with the top ladder section to support the platform in the working condition thereof, and to a storage mode when the top and bottom ladder sections are collapsed, and to a transport mode to cooperate with the bottom ladder section when the top and bottom ladder sections are collapsed to provide handles for transporting the foldable portable tree stand over the ground, wherein the beam means comprises a pair of double-angled beams each having a center section and first and second oppositely extending end sections, wherein both end sections are angled with respect to the center section, the first end sections being pivotally attached to the platform, the second end sections being retained to the top ladder section when the double-angled beams are in the support mode thereof, the first end sections being held to the bottom ladder section when the double-angle beams are in the transport mode thereof.

2. The foldable portable tree stand of claim 1 further comprising pin means secured to the bottom ladder section for holding the beam means to the bottom ladder section when the beam means is in the transport mode.

3. The foldable portable tree stand of claim 1 further comprising tube means secured to the top ladder section for retaining the beam means in the support mode.

4. The foldable portable tree stand of claim 1 wherein:
   a. the top ladder section comprises a pair of first tubes secured thereto; and
   b. the second ends of the double-angle beams are retained in the first tubes when the double-angle beams are in the support mode.

5. A foldable portable tree stand comprising:
   a. a bottom ladder section having upper and lower ends;
   b. a top ladder section having upper and lower ends;
   c. hinge means for enabling the top and bottom ladder sections to collapse and unfold relative to each other;
   d. wheel means mounted to the bottom ladder section for transporting the foldable portable tree stand over the ground;
   e. platform means connected to the upper end of the top ladder section for rotating between a working position and a folded position;
   f. beam means for selectively pivoting to a support mode to cooperate with the top ladder section to support the platform in the working condition thereof, and to a storage mode when the top and bottom ladder sections are collapsed, and to a transport mode to cooperate with the bottom ladder section when the top and bottom ladder sections are collapsed to provide handles for transporting the foldable portable tree stand over the ground;
   g. a pair of second tubes secured to the upper end of the bottom ladder section; and
   h. a pair of legs removably inserted in the lower end of the bottom ladder section, the legs being removable from the lower end of the bottom ladder section, and being assemblable into the second tubes and the wheel means when the top and bottom ladder sections are collapsed relative to each other, the second tubes and the wheel means cooperating to retain the legs to the upper end of the bottom ladder section,
      so that selected items can be placed on the legs for transport.

6. A foldable portable tree stand comprising:
   a. a bottom ladder section having upper and lower ends;
   b. a top ladder section having upper and lower ends;
   c. hinge means for enabling the top and bottom ladder sections to collapse and unfold relative to each other;
   d. wheel means mounted to the bottom ladder section for transporting the foldable portable tree stand over the ground;
   e. platform means connected to the upper end of the top ladder section for rotating between a working position and a folded position;
   f. beam means for selectively pivoting to a support mode to cooperate with the top ladder section to support the platform in the working condition thereof, and to a storage mode when the top and bottom ladder sections are collapsed, and to a transport mode to cooperate with the bottom ladder section when the top and bottom ladder sections are collapsed to provide handles for transporting the foldable portable tree stand over the ground;
   g. first guard means for selectively sliding within the upper end of the top ladder section between a stored location substantially inside the top ladder section and an operative location substantially out of the top ladder section whereat the first guard means provides a front railing for the platform means; and
   h. second guard means for selectively sliding in the first guard means between a stored location whereat the second guard means is substantially coplanar with the first guard means and an operative location whereat the second guard means extends perpendicular to the first guard means to provide side railings for the platform means.

7. The foldable portable tree stand of claim 6 wherein:
   a. the first guard means comprises:
      i. a front guard having two side legs that are slidable within the top ladder section and a cross leg that connects the two side legs; and
      ii. pin means for engaging the top ladder section and the front guard side legs to retain the front guard in the operative location; and
   b. the second guard means comprises a pair of L-shaped side guards each comprising first and second arms, the first arms being inserted into associated front guard side legs and the second arms overlying the front guard cross leg when the side guards are in the stored location, the side guard second arms being inserted into the associated front guard side legs and the first arms extending perpendicular to the front guard cross leg when the side guards are in the operative location.

8. Apparatus selectively convertible between an unfolded condition for supporting a person at an elevated position above the ground and a collapsed condition for transporting over the ground comprising:
   a. top and bottom ladder sections hinged to each other for swinging between an unfolded condition whereat the top and bottom ladder sections are coplanar and a collapsed condition whereat the top and bottom ladder sections lie side by side;
   b. a pair of wheels mounted to the bottom ladder section;
   c. a platform rotatably connected to the top ladder section; and
   d. beam means permanently attached to the platform for selectively pivoting relative thereto between a support mode at which the beam means cooperates with the top ladder section to support the platform in a working condition and a transport mode at which the beam means is held to the bottom ladder section to facilitate transport over the ground.

9. The apparatus of claim 8 wherein the top ladder section comprises tube means for retaining the second end sections of the double-angle beams when the double-angle beams are in the support mode.

10. The apparatus of claim 8 wherein the bottom ladder section comprises pin means for holding the first end sections of the double-angle beams when the double-angle beams are in the transport mode.

11. Apparatus selectively convertible between an unfolded condition for supporting a person at an elevated position above the ground and a collapsed condition for transporting over the ground comprising:
   a. top and bottom ladder sections hinged to each other for swinging between an unfolded condition whereat the top and bottom ladder sections are coplanar and a collapsed condition whereat the top and bottom ladder sections lie side by side, wherein the bottom ladder section comprises:
      i. a pair of hollow rails and a plurality of rungs extending between and joined to the rails;

ii. a pair of legs each being retained within an associated rail, the legs being independently slidable inside the rails to extend for selected distances outside of the rails and being pinable to the rails at the selected distances to thereby enable the bottom ladder section to accommodate uneven ground; and iii. first and second pairs of tubes secured to the rails, the legs being slidable out of the bottom ladder section rails and assemblable into the first and second pairs of tubes when the top and bottom ladder sections are in the collapsed condition to provide extensions of the bottom ladder section for supporting selected items;

b. a pair of wheels mounted to the bottom ladder section;

c. a platform rotatable connected to the top ladder section; and d. beam means attached to the platform for selectively pivoting relative thereto between a support mode at which the beam means cooperates with the top ladder section to support the platform in a working condition and a transport mode at which the beam means is held to the bottom ladder section to facilitate transport over the ground.

12. Apparatus selectively convertible between an unfolded condition for supporting a person at an elevated position above the ground and a collapsed condition for transporting over the ground comprising:

a. top and bottom ladder sections hinged to each other for swinging between an unfolded condition whereat the top and bottom ladder sections are coplanar and a collapsed condition whereat the top and bottom ladder sections lie side by side;

b. a pair of wheels mounted to the bottom ladder section;

c. a platform rotatably connected to the top ladder section, wherein the top ladder section comprises:

i. a pair of hollow rails having a plurality of rungs extending between and joined thereto; and ii. a front guard having a pair of side legs received in associated top ladder section rails and a cross leg secured to the side legs, the front guard being slidable to a selected distance out of the top ladder section rails and being pinable to the rails at the selected distance to provide a front railing for the platform, wherein the top ladder section further comprises a pair of side guards each having a first arm that is slidably received in an associated front guard side leg and a second arm, the second arms of the side guards extending perpendicular to the cross leg of the front guard to provide side railings for the platform; and d. beam means attached to the platform for selectively pivoting relative thereto between a support mode at which the beam means cooperates with the top ladder section to support the platform in a working condition and a transport mode at which the beam means is held to the bottom ladder section to facilitate transport over the ground.

13. A method of converting a tree stand from unfolded to collapsed conditions comprising the steps of:

a. rotatably connecting a platform to the upper end of a top ladder section;

b. mounting wheels to a bottom ladder section;

c. providing a pair of double-angled beams each having a center section and first and second oppositely extending end sections, wherein both end sections are angled with respect to the center section, and pivotally connecting the first ends of the double-angle beams to the platform and retaining the second ends of the double-angle beams to the top ladder section to support the platform in a working position on the top ladder section;

d. swinging the top ladder section into overlying contact with the bottom ladder section;

e. simultaneously rotating the platform in a first direction relative to the top ladder section and removing the double-angle beams second ends from the top ladder section;

f. rotating the platform in a second direction and overlying the platform on the top ladder section;

g. pivoting the double-angle beams into contact with the bottom ladder section; and h. holding the double-angle beams to the bottom ladder section and thereby providing handles from the double-angle beams second ends for transporting the tree stand over the ground.

14. The method of claim 13 comprising the further steps of:

a. sliding two legs out of a lower end of the bottom ladder section; and b. assembling the legs to the upper end of the bottom ladder section and thereby providing extensions of the bottom ladder section for carrying selected items.

15. The method of claim 13 comprising the further steps of:

a. sliding a front guard out of the upper end of the top ladder section for a selected distance;

b. pinning the front guard to the top ladder section at the selected distance and thereby a providing a front railing for the platform;

c. providing a pair of side guards each having first and second arms;

d. sliding the first arms of the side guards into the front guard with the side guard second arms being parallel to the plane of the front guard;

e. removing the side guards from the front guard; and f. sliding the second arms of the side guards into the front guard with the side guard first arms perpendicular to the plane of the front guard and thereby providing side railings for the platform.

* * * * *